United States Patent [19]

Szloboda

[11] Patent Number: 4,596,211

[45] Date of Patent: Jun. 24, 1986

[54] APPARATUS FOR ENABLING AN ENGINE TO BURN EITHER LIQUID FUEL OR GASEOUS FUEL

[76] Inventor: David T. Szloboda, 10640 Skagit Drive, Richmond, British Columbia, Canada, V7E 2A2

[21] Appl. No.: 626,159

[22] Filed: Jun. 29, 1984

[51] Int. Cl.⁴ .............................................. F02B 3/00
[52] U.S. Cl. ............................. 123/27 GE; 123/525; 48/180 C; 261/DIG. 68
[58] Field of Search .................. 123/525, 527, 27 GE, 123/575; 48/180 C; 261/DIG. 68; 251/321

[56] References Cited

U.S. PATENT DOCUMENTS

| | | | |
|---|---|---|---|
| 2,675,793 | 4/1954 | Ziege | 123/525 |
| 4,347,824 | 9/1982 | Pierson | 123/525 |
| 4,386,594 | 6/1983 | Szloboda | 123/525 |
| 4,413,607 | 11/1983 | Batchelor et al. | 123/525 |
| 4,483,298 | 11/1984 | Schutz | 251/321 |
| 4,485,792 | 12/1984 | van der Weide | 123/525 |

Primary Examiner—Charles J. Myhre
Assistant Examiner—David A. Okonsky
Attorney, Agent, or Firm—Fleit, Jacobson, Cohn & Price

[57] ABSTRACT

Apparatus for enabling an engine to burn either liquid fuel or gaseous fuel, which apparatus comprises: a gaseous fuel control valve for installation in a gaseous fuel supply line leading from a gaseous fuel storage container to an intake manifold of the engine, a liquid fuel shut-off valve for shutting off the supply of liquid fuel when the engine is to run on gaseous fuel, and a gaseous fuel shut-off valve for shutting off the supply of gaseous fuel when the engine is to run on liquid fuel, the gaseous fuel control valve being such that it has a diaphragm which is positioned in a chamber and which operates in association with a gas inlet and a gas outlet to the chamber to apportion the gaseous fuel to the engine in dependence upon the operating requirements of the engine.

7 Claims, 3 Drawing Figures

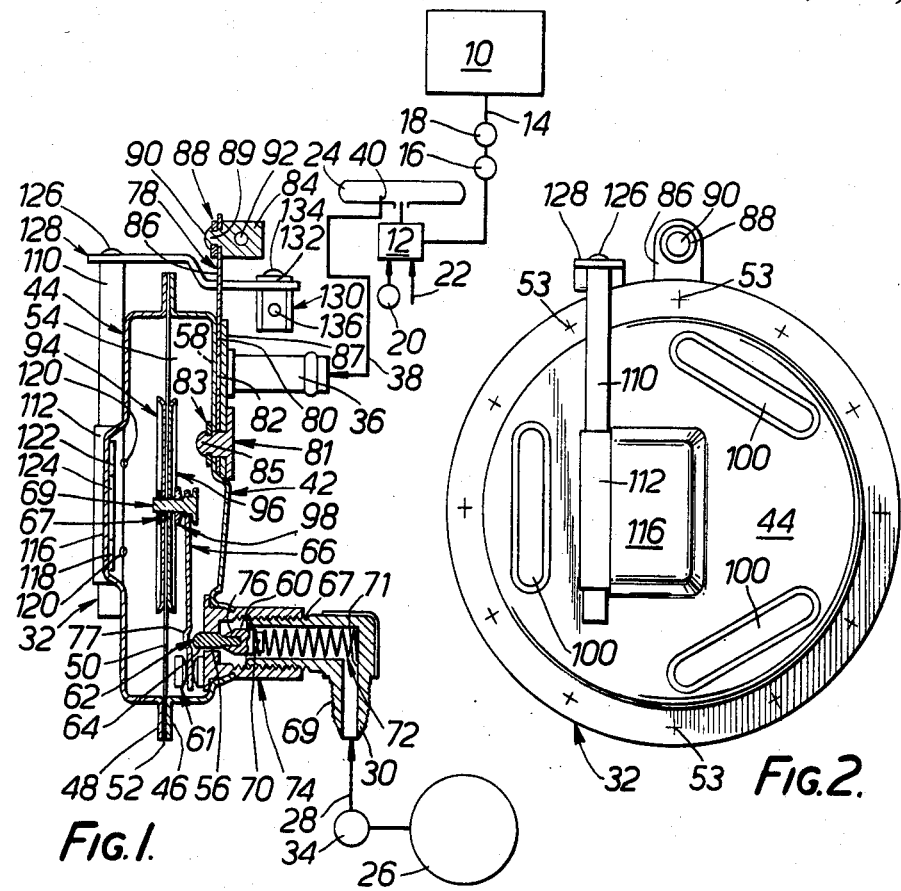
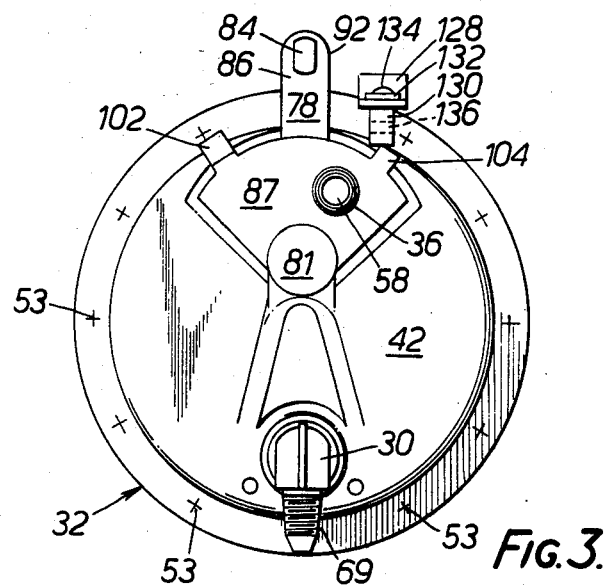

APPARATUS FOR ENABLING AN ENGINE TO BURN EITHER LIQUID FUEL OR GASEOUS FUEL

This invention relates to apparatus for enabling an engine to burn either liquid fuel or gaseous fuel.

Various systems are known for enabling vehicles with liquid fuel burning engines to also run when desired on compressed or liquified gaseous fuels. These gaseous fuels are often known as liquified petroleum gas (L.P.G.) fuels and examples of such gaseous fuels are propane, butane and natural gas, One particularly advantageous system for enabling an engine to burn either liquid fuel or gaseous fuel is described and claimed in my prior U.S. Pat. No. 4,386,594.

In my prior patent, there is specifically illustrated apparatus in whch a spring is used to bias an inlet valve obturator means to a position in which it closes a gas inlet into a chamber. The spring also permanently biases a diaphragm in a direction which tends to increase the size of the chamber.

I have now discovered that the apparatus illustrated in my prior patent is more sensitive at low engine suction conditions in the intake manifold if the diaphragm is not permanently biased by the spring. More specifically, if the diaphragm is not spring biased when the low engine suction conditions exist in the intake manifold, then the apparatus is appreciably more sensitive in operation under these low engine suction conditions.

Accordingly, this invention provides apparatus for enabling an engine to burn either liquid fuel or gaseous fuel, which apparatus comprises:

(i) a gaseous fuel control valve for installation in a gaseous fuel supply line leading from a gaseous fuel storage container to an intake manifold of the engine, (ii) a liquid fuel shut-off valve for shutting off the supply of liquid fuel when the engine is to run on gaseous fuel, and (iii) a gaseous fuel shut-off valve for shutting off the supply of gaseous fuel when the engine is to run on liquid fuel, the gaseous fuel control valve comprising:

(a) housing means defining a compartment, (b) a diaphragm which is positioned in the compartment and which defines one wall of a chamber, the housing means defining the remaining boundaries of the chamber, and the side of the diaphragm opposite the chamber being in communication with atmospheric pressure, (c) a gas inlet into the chamber and adapted for connection with a conduit leading from the gaseous fuel storage container.

(d) a gas outlet from the chamber and adapted for connection to an intake manifold of the engine, (e) outlet valve obturator means which is controlled by an accelerator pedal of a vehicle in use of the apparatus and which is for controlling the intensity of the suction applied to the chamber in response to the position of the accelerator pedal, whereby the flow rate of the gaseous fuel through the gas outlet to the intake manifold of the engine is regulated by the suction created by the engine in the intake manifold so that a correct air:gaseous fuel mixture is achieved for varying engine operating requirements, and (f) inlet valve obturator means for controlling the flow of gaseous fuel through the gas inlet into the chamber, the inlet valve obturator means being so connected with respect to the diaphragm that movement of the diaphragm in a direction tending to decrease the size of the chamber increases the size of the inlet and movement of the diaphragm in a direction tending to increase the size of the chamber decreases the size of the inlet, and the gaseous fuel control valve being such that the inlet valve obturator means is positioned outside the chamber and is spring biassed to a closed position by a spring, the spring being positioned outside the chamber and in the path of the flow of gaseous fuel to the chamber, and the spring being such that it does not operate to bias the diaphragm until the suction created by the engine in the intake manifold is large enough to cause appreciable movement of the diaphragm in the direction tending to decrease the size of the chamber, whereupon the diaphragm will cause the valve obturator means to move to an open position against the pressure from the spring.

The apparatus is very sensitive at low engine suction or vacuum conditions in the intake manifold. The apparatus acts as a quantity apportioning valve where the quantity apportioned is define by each and every engine differently, according to the engine's need, expressed by the engine's intake manifold suction.

Preferably, the apparatus is one in which the diaphragm is connected to a valve lifting member, and in which the inlet valve obturator means is provided with a guide member, the valve lifting member being pivotable about a pivot point to engage the valve guide member and cause the valve obturator means to move to an open position when the suction created by the engine in the intake manifold is large enough to cause the appreciable movement of the diaphragm in the direction tending to decrease the size of the chamber.

Preferably, the inlet valve obturator means has a conical portion part of which is connected to the valve guide member and part of which obturates the gas inlet, and the inlet valve obturator means has a reduced diameter portion remote from the conical portion, the reduced diameter portion serving to provide a seat for one end of the spring.

The valve guide member may be an elongate member having longitudinally extending grooves in its sides.

The outlet valve obturator means may comprise a pivoting sliding plate.

The apparatus of the invention advantageously includes diaphragm hold-down means for holding the diaphragm in a down position tending to increase the size of the chamber when the engine is to operate at maximum acceleration, whereby the gas inlet will be retained permanently open so that an increased amount of gaseous fuel can be drawn from the chamber by the suction.

The diaphragm hold-down means may comprise a pivotally mounted plate which is positioned in the chamber, the plate being pivotable by virtue of being connected to a rotatable rod which extends outside of the chamber and which is rotatable in dependence upon the position of the accelerator pedal.

The apparatus of the invention may also advantageously include preheating means for preheating the gaseous fuel after it has left the gas outlet and before it reaches the inlet manifold.

The preheating means may comprise a gas conduit which is caused to pass around the exhaust manifold of the engine.

The liquid fuel shut off valve and the gaseous fuel shut off valve may be an appropriate type of valve and they may be, for example, valves which require to be flicked from one position to another to cause them to change their state, or valves which require to be rotated to cause them to change their operational state, or valves which operate in a push/pull mode.

The present invention also extends to vehicles when provided with the apparatus of the invention. The vehicles may be any desired vehicles such for example as motor cars and commercial vehicles such as lorries and buses.

An embodiment of the invention will now be described solely by way of example and with reference to the accompanying drawings in which:

FIG. 1 is a section through apparatus for enabling an engine to burn either liquid fuel or gaseous fuel;

FIG. 2 is an end view of the apparatus shown in FIG. 1 and looking from left to right; and FIG. 3 is an end view of the apparatus shown in FIG. 1 and looking from right to left.

Referring to the drawings a conventional gasoline fuel system is schematically shown to include a fuel tank 10, a carburettor 12, and a fuel supply line 14 leading from the tank 10 to the fuel inlet of the carburettor 12. The line 14 includes a fuel pump 16 and a liquid fuel shut-off valve in the form of an ON/OFF valve 18. The carburettor 12 includes an accelerator pedal operated valve 20 and an air inlet 22. The outlet of the carburettor 12 is connected to the intake manifold 24 of an internal combustion engine.

The gaseous fuel system comprises a gaseous fuel storage tank 26, a gaseous fuel supply line 28 leading from the tank 26 to an inlet fitting 30 of a gaseous fuel control valve 32, and a gaseous fuel shut-off valve in the form of an ON/OFF valve 34. The valve 34 is located in the fuel supply line 28.

The valve 32 includes a gas outlet fitting 36 which is connected to a conduit 38 which delivers a metered amount of gaseous fuel from the valve 32 into the intake manifold 24. According to an aspect of the invention, the gaseous fuel is discharged at a location 40 which is generally below and to the engine wall side of the location where the carburettor 12 delivers a fuel:air mixture into the intake manifold when gasoline is being burned by the engine. When the gaseous fuel is discharged into the intake manifold 24, it can then mix with the air passing through the carburettor 12 when the valve 18 has been turned off and the engine is to run only on the gaseous fuel.

The valve 32 comprises a two part housing 42, 44 having flanges 46, 48 where the two housing parts 42, 44 are joined. A diaphragm 50 is located within the housing and it includes an outer peripheral portion 52 which is clamped between the flanges 46, 48. The clamping is effected by nuts and bolts shown schematically as crosses 53.

As shown, the diaphragm 50 and the housing part 42 of the housing together define a chamber 54 which is essentially closed but which includes a gas inlet orifice 56 and a gas outlet orifice 58.

An inlet valve obturator member 60 is mounted as shown outside the chamber 54. The inlet valve obturator member 60 is connected to a guide member 62 which passes through the inlet orifice 56. The inlet valve obturator member 60 may be made of nylon. The guide member 62 is elongate as shown and it has three longitudinally extending grooves in its sides, one groove being shown as groove 64.

A valve lifting member 66 is loosely pivotally connected at one end to a support rivet 61 and is loosely pivotally connected at its other end to a bolt 69. The bolt 69 is secured to the diaphragm 50 by a nut 67.

The inlet valve obturator member 60 has a reduced diameter portion 70 which receives and locates one end of a coil spring 72. It will be seen that the spring 72 is positioned outside of the chamber 54 and the end of the spring 72 remote from the portion 70 abuts against the wall 71 of the inlet fitting 30. The inlet fitting 30 has an external thread 69 for facilitating connection to the gaseous fuel supply line 28. The inlet fitting 30 also has an external thread 67 so that the inlet fitting 30 can be screwed into the stub pipe 74 which projects out of the housing part 42.

The inlet valve obturator member 60 includes a conical portion 76 which is for giving a good seal at the inlet orifice 56.

As will be apparent, movement of the diaphragm 50 to the right as shown in FIG. 1 will result in a decrease in the size of the chamber 54. If the diaphragm 50 moves sufficiently far to the right, a dimple 77 in the valve lifting member 66 will engage the head of the guide member 62 and will move the guide member 62 and its attached inlet valve obturator member 60 to the right. The gas inlet orifice 56 is thus opened to permit a flow of gas from the tank 26 through the orifice 56 and into the chamber 54. Movement of the diaphragm 50 to the left as shown in FIG. 1 will result in an increase in the size of the chamber 54 and a decrease and eventual closing of the orifice 56 by the conical portion 76 of the closure member 60, the spring 72 being effective to bias the closure member 60 to its orifice closing position.

The valve 32 includes a gas flow control valve 78. The valve 78 is controlled by an accelerator pedal of the vehicle. The valve 78 comprises a pivoted sliding plate obturator member 80 located between the outlet orifice 58 and the outlet fitting 36. Pivoting of the obturator member 80 about a pivot rivet 81 causes a change in the registering area of the orifice 58 and an orifice 82 in the obturator member 80. A spacer washer 83 and a deformed head 85 on the rivet 81 secure the rivet 81 to the housing part 42, the plate of the obturator member 80 and a plate 87 to which the gas outlet fitting 36 is attached.

A control rod (not shown) which moves in response to movement of the accelerator pedal, is secured to an anchor member 84 which is pivotally attached to a lever 86 which is integrally formed with the plate part of the obturator member 80. The anchor member 84 is secured to the lever 86 by a spacer washer 88 and the deformed head 90 of a shank portion 89 of the anchor member 84. The anchor member 84 is provided with a hole 92 for receiving an anchor pin (not shown) by means of which the control rod can be secured to the anchor member 84.

The diaphragm 50 has its centre portion sandwiched between a pair of stiffener plates 94, 96. The stiffener plates 94, 96 are held in position by the bolt 69 and the nut 67. A spacer ring 98 is also positioned on the bolt 69 as shown and this spacer ring 98 helps the pivoting of the valve lifting member 66 about the bolt 69.

As shown, the side of the diaphragm 50 opposite or outside of the chamber 54 is in communication with atmospheric pressure, such as via three opening slots 100 in the housing part 44.

It is believed that the best location to mount the valve 32 is on the engine as close as possible to a position which is vertically in line with the carburettor control arm. The control rod is then connected at its end opposite the anchor member 84 to the carburettor control arm (not shown). This connection of the control rod to the carburettor control arm ensures that an appropriate amount of air for admixture with the gas coming from the conduit 38 is achieved. This position of mounting the valve 32 will ensure that any vibration or rattling of the engine will not cause motion which will adversely affect operation of the valve 32.

The manner of installing the valve 32 in a vehicle may be as follows. The vehicle engine is first run on gasoline to warm it up until the automatic choke opens. Then, the gasoline line 14 is closed by operation of the ON/OFF valve 18. The engine will continue to burn gasoline until all of the gasoline in the carburettor 12 is completely used up. Then, the user connects the control rod to the accelerator linkage and preferably to the control arm on the carburettor.

The obturator member 80 is initially closed. Then mouth suction is applied on the conduit 38 and at the same time the obturator member 80 is set to a slightly open or approximate idling speed position. Next, the lower end of the conduit 38 is positioned inside the intake manifold 24, substantially immediately below the opening leading from the carburettor 12, on the engine block side thereof. This may easily be done by inserting a piece of copper pipe of appropriate length through a brass nipple which is adapted to thread into an opening provided in the manifold 24, such that when the nipple is tightened, the inner end of the copper pipe is properly placed below the opening leading from the carburettor 12, to the engine block side of the intake manifold 24. A short length of the copper pipe is allowed to project upwardly through the nipple, for connection to a hose which forms the remaining part of the conduit 38 leading from the gas outlet fitting 36 to the piece of copper pipe.

The gaseous fuel storage tank 26 may be located at any convenient and legal location within the vehicle. As is well known, the tank 26 will include liquified gaseous fuel and the fuel above the liquid level (not shown) in the tank 26 will be in gaseous form. The gaseous fuel supply line 28 is connected between the storage tank 26 and the inlet fitting 30 as shown.

After such installation has been accomplished, the ON/OFF valve 34 is opened. The engine is started and any necessary adjustments are made to set the idling position of the obturator member 80. Then, the connection is made between the control rod and the anchor member 84. The obturator member 80 will require the amount of gas needed for different sizes of engines. If desired, the obturator member 80 can be adjusted not to open completely at maximum r.p.m., but only as desired for maximum fuel efficiency at any speed. The pivoting movement of the obturator member 80 can be regulated by a pair of stop members 102, 104 formed integrally with the plate 87.

The tank 26 does not include a pressure reducing valve in its outlet. As a result of this fact, and at least partially also due to the relatively close location of the chamber 54 to the manifold 24, icing of fittings and conduits should be prevented or reduced.

The ON/OFF valves 18, 34 are preferably readily available low cost valves which are adapted to be controlled by manual choke cables.

In use of the valve 32, it is important when switching from gasoline to gaseous fuel to use up all of the gasoline that remains in the carburettor 12 before opening the gaseous fuel valve 34. If this is not done, the engine will receive both gaseous fuel and gasoline and will become flooded. When switching from gaseous fuel to gasoline, it may be necessary to usually start one or twice to cause the gasoline pump to pump gasoline into the empty carburettor.

Proper operation of the valve 32 will produce a fluttering movement of the valve lifting member 66 and the diaphragm 50. At high speeds, the "fluttering" movement will result in a rattling sound inside the valve 32 which can be detected by use of a listening device, indicating proper functioning of the valve 32. Gaseous fuel entering the chamber 54 through the orifice 56 will expand and will increase the pressure within the chamber 54. At the same time, the suction or vacuum present in the intake manifold 24, communicated with the chamber 54 via the conduit 38, the inlet fitting 36, the valve orifice 82 in the obturator member 80 and the orifice 58, will tend to lower the pressure within the chamber 54. Thus, there are two opposite forces acting on the same side of the diaphragm 50. The expanding gas from the orifice 56 will act to force the diaphragm 50 to the left as shown in FIG. 1, and the suction will act to cause the diaphragm 50 to move to the right as shown in FIG. 1. As the expanding gas forces the diaphragm 50 to the left, the spring 72 causes the closure member 60 to close the orifice 56. This prevents the gas entering the chamber 56 and the suction then becomes the dominant force controlling the movement of the diaphragm 50. In use of the valve 32, the diaphragm 50 will be constantly moving or fluttering as the gas is apportioned.

The valve 32 may be regarded as a quantity apportioning valve. The quantity apportioned may be defined by each and every engine differently, according to the engine's need as expressed by its intake manifold suction or vacuum. The valve 32 can be used by a wide variety of internal cumbustion engines including gasoline, diesel, turbine, jet and Wankel engines for example. The engines can be part of vehicles or they can be stationery, for example for use in industrial applications. The valve 32 is extremely accurate at low engine intake manifold suction conditions mainly because it has no spring in the chamber acting on the centre of the disphragm 50.

The valve 32 may eliminate the need for a pressure regulating valve in the outlet of the tank 26 and the known associated problem of icing caused by the decompression of the gas. The expansion through the small orifice of a pressure regulator valve results in a decrease in temperature of the gas to a level at which the gas freezes solid. This is clearly undesirable and this problem is obviated or reduced by the present invention.

The valve 32 is also such that it facilitates the reduction or obviation of unwanted engine exhaust emissions such as carbon dioxide. Also, adjustment of an engine after it has been fitted with the apparatus of the invention is not necessary.

Engine operating conditions may arise in which a kick-down facility giving sudden acceleration is required. Accordingly, the valve 32 is provided with diaphragm hold-down means which operates to give a kick-down facility. The diaphragm hold-down means comprises a rod 110 which is pivotally mounted to the housing part 44. More specifically, the rod 110 passes through a raised tunnel portion 112 of the housing part 114. The raised tunnel portion 112 extends into a further raised portion 116 of the housing part 44. Inside the housing part 44 and in the concave recess formed by the raised portion 116 is located a plate 118. The plate 118 is bolted by two fastening bolts 120 directly to the rod 110 so that the plate 118 stops the rod 110 from pulling out of the housing part 44. The upper edge 122 of the plate 118 is provided with a central cut-out 124 so that the plate 118 does not foul the nut 67.

The rod 110 has a deformed head 126 by means of which the rod 110 is secured to a kick-down lever 128. The lever 128 is cranked as shown and the other end of the lever 128 is provided with a pivotally connected anchor member 130. The anchor member 130 is held in position by a washer 132 and a deformed head portion 134 of the anchor member 130. The anchor member 130 is provided with a hole 136 for receiving an anchor pin (not shown) by means of which a kick-down linkage to the accelerator pedal of a vehicle may be connected to the anchor member 130.

When maximum acceleration from the engine is required, the accelerator pedal will be kicked down and the rod 110 will rotate consequent upon pivotting of the lever 128. The plate 118 will then pivot from its rest position in the concave recess defined by the raised portion 116 of the housing part 44 and it will hold the diaphragm 50 in its downward position so that the diaphragm 50 will not be able to be moved upwardly by virture of expansion of the compressed gas passing through the orifice 56 into the chamber 54. This will allow the vacuum in the gas outlet fitting 36 to draw off more gas from the chamber 54 than would be the case if the diaphragm 50 were allowed to move upwardly and thus increase the size of the chamber 54.

Although not shown in the drawings, the apparatus may be used with preheating means for preheating the gaseous fuel after it has left the gas outlet 36 and before it reaches the inlet manifold 24. The preheating means may be in the form of an extension of the conduit 38 so that it forms a coil around an exhaust manifold of the engine. Because the exhaust manifold is hot, it will heat the gas in the conduit 38. This gas in the conduit 38 may be almost at freezing point due to the fact that it will have expanded considerably from when it was in the tank 26. Considerably further expansion of the gas occurs in the coil than would take place only in the intake manifold 24. This expanded gas is thus more easily able to satisfy the suction in the intake manifold 24 and so there is less of a suction acting on the bottom of the diaphragm 50. This in turn means that a smaller amount of gas is required to be withdrawn from the chamber 54, which in turn gives greater fuel efficiency.

It is to be appreciated that the embodiment of the invention described above with reference to the accompanying drawings has been given by way of example only and that modifications may be effected and any desired stated parts may be omitted. Thus, for example, the tank 26 may have one or more heat loss compensators to allow driving in all weather conditions including sub-zero temperatures. Also various adjustment screws may be provided, either on the valve 32 or, more usually, on the connecting rods and levers.

I claim:

1. Apparatus for enabling an engine to burn either liquid fuel or gaseous fuel, which apparatus comprises:
   (i) a gaseous fuel control valve for installation in a gaseous fuel supply line leading from a gaseous fuel storage container to an intake manifold of the engine,
   (ii) a liquid fuel shut-off valve for shutting off the supply of liquid fuel when the engine is to run on gaseous fuel, and
   (iii) a gaseous fuel shut-off valve for shutting off the supply of gaseous fuel when the engine is to run on liquid fuel, the gaseous fuel control valve comprising:
   (a) housing means defining a compartment,
   (b) a diaphragm which is positioned in the compartment and which defines one wall of a chamber, the housing means defining the remaining boundaries of the chamber, and the side of the diaphragm opposite the chamber being in communication with atmospheric pressure,
   (c) a gas inlet into the chamber and adapted for connection with a conduit leading from the gaseous fuel storage container,
   (d) a gas outlet from the chamber and adapted for connection to an intake manifold of the engine,
   (e) outlet valve obturator means which is controlled by an accelerator pedal of a vehicle in use of the apparatus and which is for controlling the intensity of the suction applied to the chamber in response to the position of the accelerator pedal, whereby the flow rate of the gaseous fuel through the gas outlet to the intake manifold of the engine is regulated by the suction created by the engine in the intake manifold so that a correct air: gaseous fuel mixture is achieved for varying engine operating requirements, and
   (f) inlet valve obturator means for controlling the flow of gaseous fuel through the gas inlet into the chamber, the inlet valve obturator means being so connected with respect to the diaphragm that movement of the diaphragm in a direction tending to decrease the size of the chamber increases the size of the inlet and movement of the diaphragm in a direction tending to increase the size of the chamber decreases the size of the inlet, and the gaseous fuel control valve being such that the inlet valve obturator means is positioned outside the chamber and is spring biassed to a closed position by a spring, the spring being positioned outside the chamber and in the path of the flow of gaseous fuel to the chamber, and the spring being such that it does not operate to bias the diaphragm until the suction created by the engine in the intake manifold is large enough to cause appreciable movement of the diaphragm in the direction tending to decrease the size of the chamber, whereupon the diaphragm will cause the valve obturator means to move to an open position against the pressure from the spring.

2. Apparatus according to claim 1 in which the outlet valve obturator means comprises a pivotting sliding plate.

3. Apparatus according to claim 1 and including diaphragm hold-down means for holding the diaphragm in a down position tending to decrease the size of the chamber when the engine is to operate at maximum acceleration, whereby the gas inlet will be retained permanently open so that an increased amount of gaseous fuel can be drawn from the chamber by the suction.

4. Apparatus according to claim 3 in which the diaphragm hold-down means comprises a pivotally mounted plate which is positioned in the chamber, the plate being pivotable by virtue of being connected to a rotatable rod which extends outside of the chamber and which is rotatable in dependence upon the position of the accelerator pedal.

5. Apparatus according to claim 1 in which the diaphragm is connected to a valve lifting member, and in which the inlet valve obturator means is provided with a guide member, the valve lifting member being pivotable about a pivot point to engage the valve guide member and cause the valve obturator means to move to an open position when the suction created by the engine in the intake manifold is large enough to cause the appreciable movement of the diaphragm in the direction tending to decrease the size of the chamber.

6. Apparatus according to claim 5 in which the inlet valve obturator means has a conical portion part of which is connected to the valve guide member and part of which obturates the gas inlet, and in which the inlet valve obturator means has a reduced diameter portion remote from the conical portion, the reduced diameter portion serving to provide a seat for one end of the spring.

7. Apparatus according to claim 6 in which the valve guide member is an elongate member having longitudinally extending grooves in its sides.

* * * * *